United States Patent [19]

Barwise

[11] Patent Number: 5,016,671
[45] Date of Patent: May 21, 1991

[54] HYDRAULIC COUPLING

[76] Inventor: Robert D. Barwise, Rte. 2, Box 208, Bovey, Minn. 55709

[21] Appl. No.: 492,494

[22] Filed: Mar. 12, 1990

[51] Int. Cl.$^5$ ............................................. F16L 37/28
[52] U.S. Cl. ................................ 137/614.04; 137/614
[58] Field of Search ............... 137/614, 614.03, 614.04

[56] References Cited

U.S. PATENT DOCUMENTS

| | | | |
|---|---|---|---|
| 2,854,258 | 9/1958 | Hichey et al. | 137/614.04 |
| 2,966,371 | 12/1960 | Bruning | 137/614.04 X |
| 3,646,964 | 3/1972 | Stratman | 137/614.03 |
| 3,730,221 | 5/1973 | Vik | 137/614.04 X |
| 4,371,004 | 2/1983 | Sysolin et al. | 137/614.04 X |
| 4,852,611 | 8/1989 | Knert et al. | 137/614.04 X |

OTHER PUBLICATIONS

Bruning Hydraulic Bulletin No. 3807, Aug. 1988.

*Primary Examiner*—John C. Fox
*Attorney, Agent, or Firm*—Burd, Bartz & Gutenkauf

[57] ABSTRACT

A hydraulic coupling assembly having first and second connectors for making fluid connections between two hydraulic fluid lines. One of the connectors has a stationary valve assembly with a valve element moveable into and out of engagement with a valve seat. The other connector has a moveable valve assembly with a second valve element movable into and out of engagement with a valve seat. The valve assembly is movable on a plunger with respect to a connector housing. A bias mechanism such as a spring biases the plunger outward with respect to the housing. When the connectors come together, the valve tips bear against each other and are mutually retracted with respect to the respective valve seats. The bias mechanism acting on the plunger in the second connector maintains the valve elements in contact with one another and in a deflected state permitting hydraulic fluid passage through the fluid passage opened between the connectors.

19 Claims, 3 Drawing Sheets

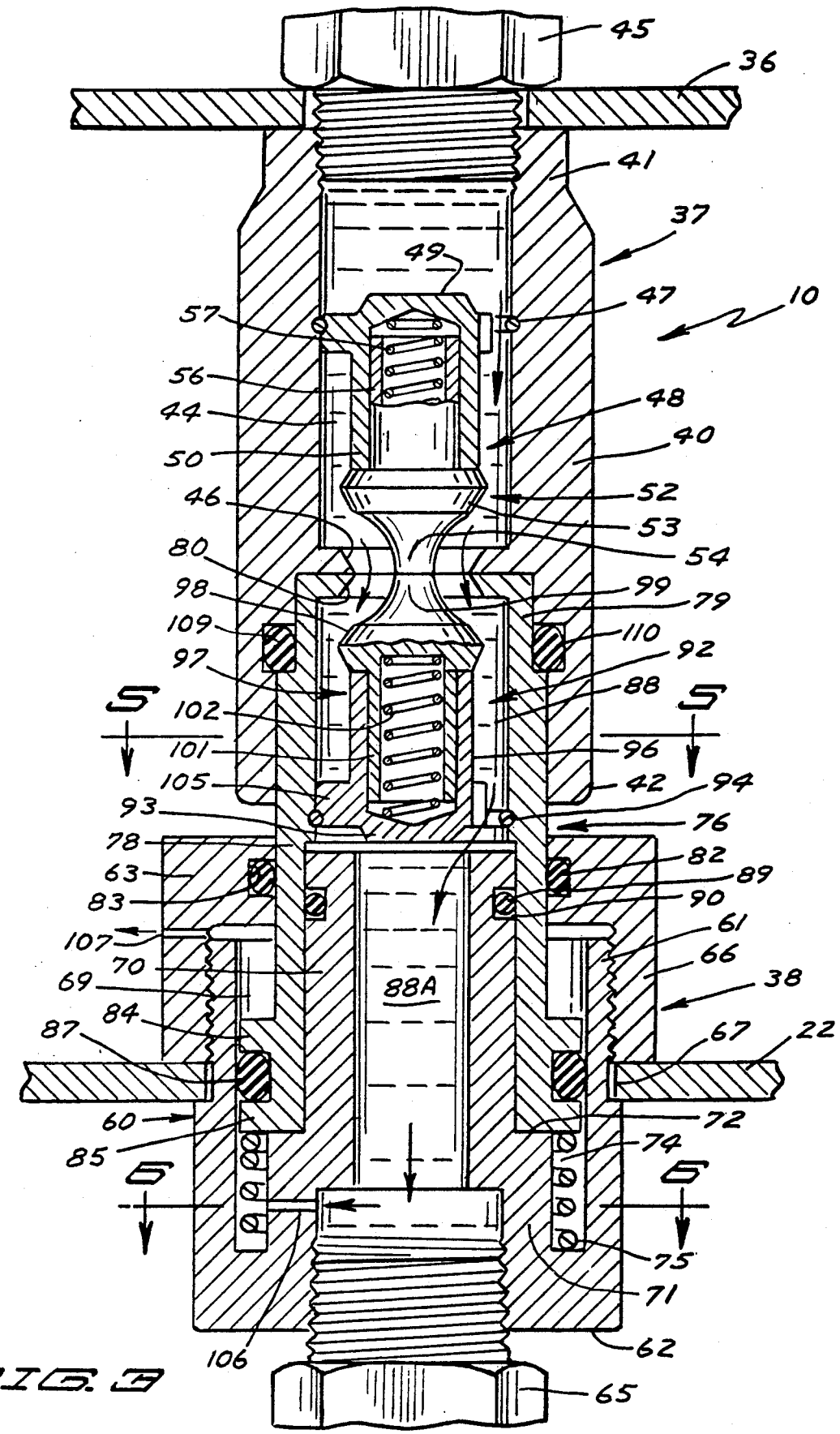

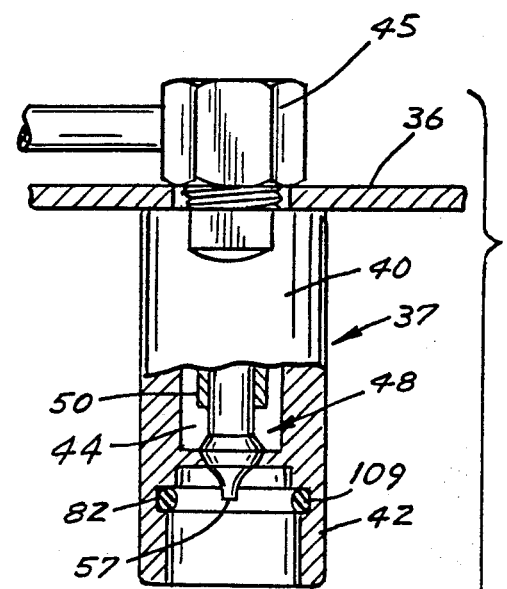
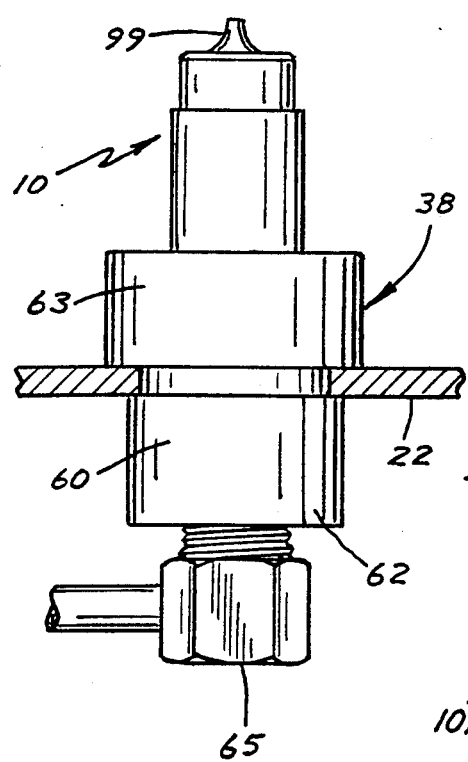
FIG. 4
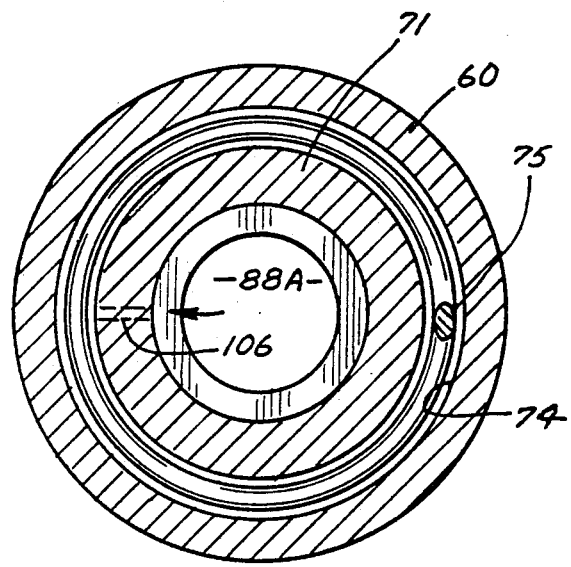
FIG. 6
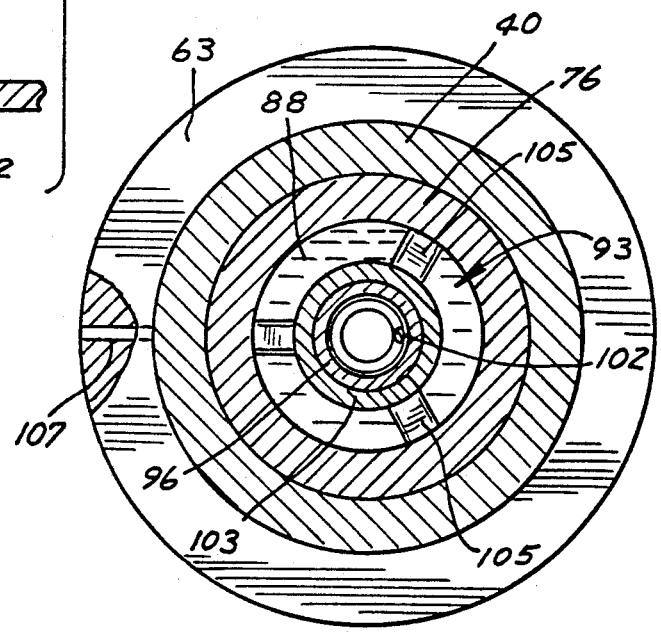
FIG. 5

HYDRAULIC COUPLING

BACKGROUND OF THE INVENTION

Releasable hydraulic couplings are used with hydraulic lines in industrial and commercial applications to connect and disconnect hydraulically operated equipment from the hydraulic fluid source. A typical hydraulic coupling includes male and female connectors with spring loaded poppet valves that mutually open when brought together and are held together by a locking mechanism such as a threaded connector or a locking sleeve. Coupling and releasing is accomplished by threading and unthreading the connector, or by engaging and disengaging a locking sleeve or other type of locking mechanism. This is done manually and requires direct access to the hydraulic coupling.

SUMMARY OF THE INVENTION

The invention relates to a hydraulic coupling for making a hydraulic fluid connection between two hydraulic fluid lines. The coupling is releasable upon movement of first and second connectors of the coupling away from one another. In the coupled position the first and second connectors are held together by external structure associated with the equipment upon which the hydraulic coupling is installed, for example, a locking mechanism releasably securing a hydraulically operated load handling member to a boom. Each connector has a valve assembly with a spring loaded poppet or pintle moveable into engagement with a valve seat to close the connector and movable away from the valve seat against the pintle spring to open the connector. When the first and second connector members come together, the pintle tips bear against each other and both are retracted into pintle housings, moving away from the valve seats and opening a fluid conduit between the connectors. One of the pintle assemblies is fixed relative to the connector housing. The other pintle assembly is mounted on a plunger that is movable with respect to the other connector housing. The plunger is spring loaded in the connector housing by a main spring that tends to move the plunger outward of a housing. When the first and second connectors are engaged, the main spring is placed in compression and exerts substantial force upon the plunger to tend to maintain the pintles of the first and second pintle assemblies in close engagement and retracted relative to the valve seats.

IN THE DRAWINGS

FIG. 3 is an enlarged sectional view of one of the hydraulic couplings of FIG. 1 taken along the line 3—3 thereof;

FIG. 4 is an assembly view of a hydraulic coupling according to the invention;

FIG. 5 is an enlarged sectional view of a portion of the hydraulic coupling of FIG. 3 taken along the line 5—5 thereof; and FIG. 6 is another enlarged sectional view of a portion of the hydraulic coupling of FIG. 3 taken along the line 6—6 thereof.

DESCRIPTION OF A PREFERRED EMBODIMENT

Figure 2:
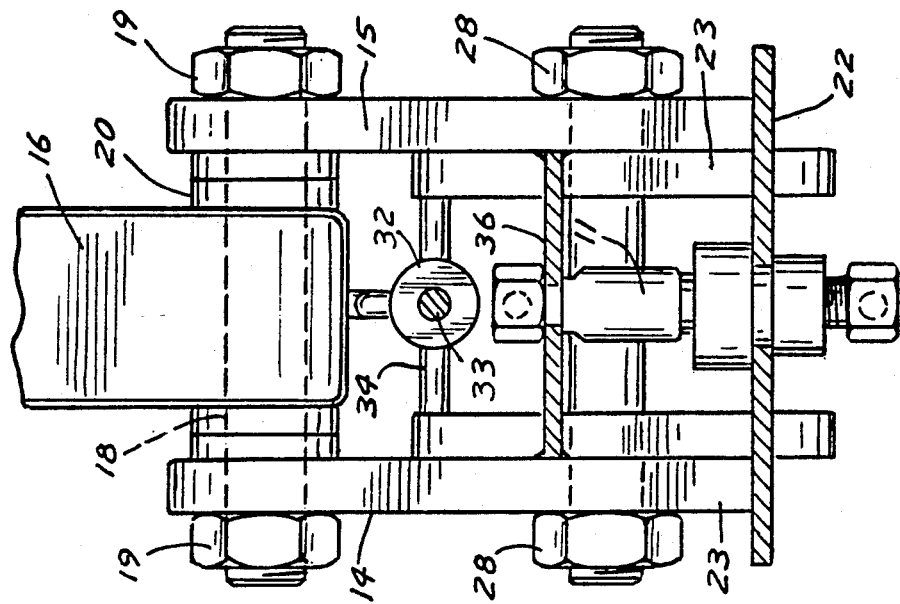
FIG. 2 is a sectional view of the load coupling mechanism of FIG. 1 taken along the line 2—2 thereof.
Figure 1:
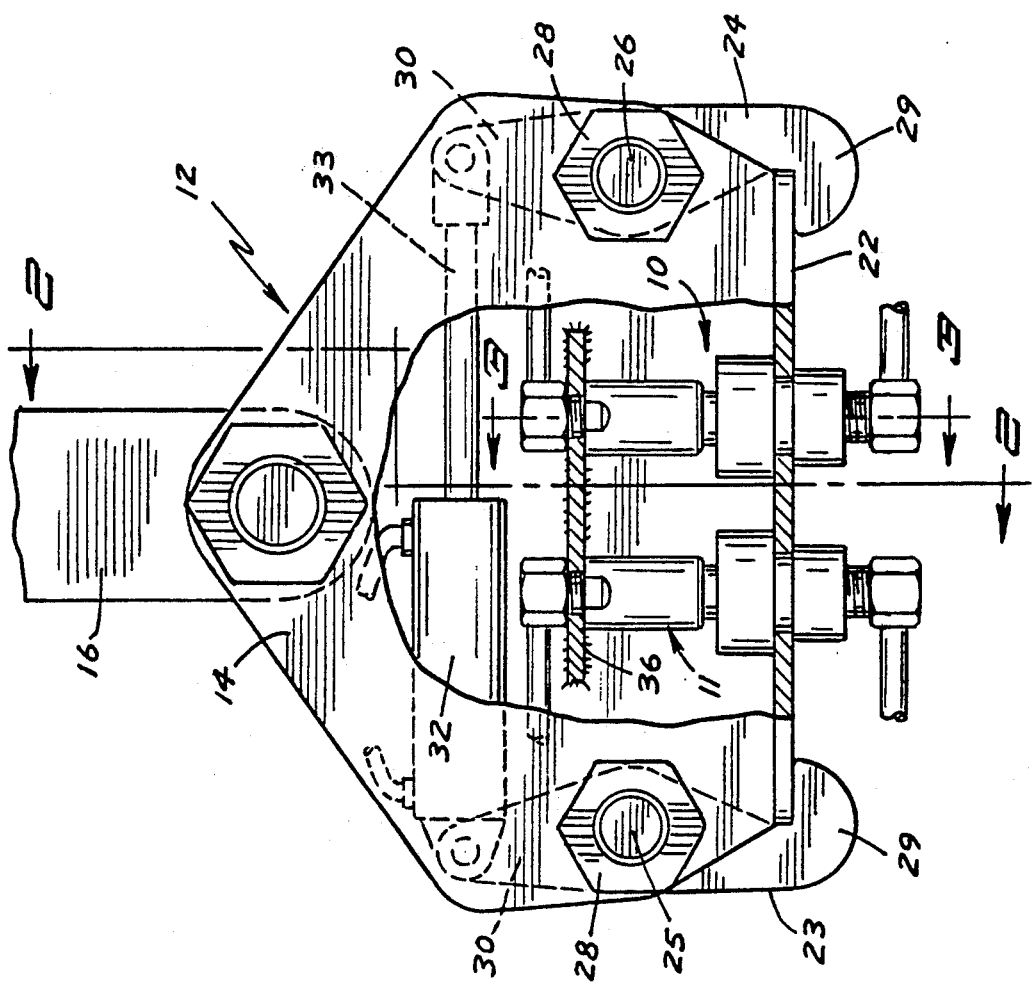
FIG. 1 is a front elevational view of a load coupling mechanism having a pair of hydraulic couplings according to the invention and shown partly fragmented for purposes of illustration.

Referring to the drawings, FIGS. 1 and 2 show a pair of hydraulic couplings 10, 11 according to the invention installed with respect to a load coupling mechanism 12 of the type having upper and lower detachable portions for purposes of connecting a hydraulically operated implement or tool to operating equipment and at the same time making the necessary hydraulic fluid connections to operate the work implement. For example, coupling mechanism 12 can be used to connect a load handling hydraulically operated grapple assembly to the boom of a log skidder vehicle of the type shown in U.S. Pat. No. 4,315,652 issued Feb. 16, 1982 to Barwise.

The upper portion of load coupler 12 includes first and second side plates 14, 15 pivotally connected to a knuckle 16 by a pivot shaft 18. Nuts 19 engage the ends of pivot shaft 18 relative to side plates 14, 15, and spacers 20 are located between the side plates and the knuckle 16. The lower portion of load coupling 12 includes a mounting plate 22 which is attached to the working implement or tool (not shown).

First and second pairs of opposing hook-like fastening members 23, 24 are pivotally mounted on opposite sides of the side walls 14, 15 by pivot pins 25, 26 and retained there by end nuts 28. The lower portions 29 of the hook-like members 23, 24 are formed with a hook portion movable into and out of engagement with opposing edges of mounting plate 22. The upper ends 30 of the hook-like members 23, 24 are pivotally connected by connecting bars 34. A hydraulic cylinder 32 is pivotally connected at one end to the bar connecting first hook-like members 23, and a rod 33 that reciprocates in and out of the cylinder 32 is pivotally connected to the connecting bar connecting the ends of the second hook-like members 24. Retraction or rod 33 with respect to cylinder 32 is effective to pivot the hook-like members 23, 24 out of engagement with the mounting plate 22. Extention of the rod 33 moves the hook-like members 23, 24 into a position of engagement with the mounting plate 22.

A support plate 36 is connected to and spans the distance between the side plates 14, 15. The upper portions of the hydraulic couplings 10, 11 are connected to the support plate 36. The lower portions thereof are mounted on the mounting plate 22. The upper portions of the couplings 10, 11 are connected to a source of hydraulic fluid under pressure and comprise the pump side or the power side of the hydraulic circuit. The lower portions of the hydraulic couplings 10, 11 are connected to the working implement and comprise part of the actuator side or work side of the hydraulic circuit.

FIG. 3 shows the hydraulic coupling 10 in section and in connected relationship. FIG. 4 shows the hydraulic coupling 10 partly in section and in disconnected relationship. Hydraulic coupling 10 includes a first connector 37 comprised as a female connector, and a second connector 38 engageable with the first connector 37 and comprised as a male connector. First connector 37 includes a generally cylindrical housing 40 having a distal end 41, a proximal end 42 and a fluid channel 44 extending between the ends. The opening to channel 44 at the distal end 41 is interiorly threaded for receipt of male threaded portion of a hydraulic fitting 45. Housing 40 is flush against an opening in the support wall 36 on one side thereof. Hydraulic connector 45 is located on the other with the male portion threaded into the distal end 41 to hold the first connector 37 securly with respect to support wall 36.

The interior walls of housing 37 forming channel 44 have an inwardly tapered section forming a valve seat 46 for a poppet or pintle valve assembly 48. Pintle valve assembly 48 includes a pintle seat or support 49 seated between interior walls of passage 44 by a retainer ring 47, and a pintle sleeve 50 extending from the pintle seat 49 toward the proximal end 42 of housing 37. A valve element or pintle 52 is mounted with respect to the pintle sleeve 50. Pintle 52 includes a pintle head 53 having a diameter larger than the sleeve 50, and a pintle tip 54 extending from head 53 in a proximal direction. A tubular pintle neck 56 is connected to pintle head 53 and has an outside diameter smaller than the inside diameter of the pintle sleeve 50. Pintle neck 56 is slideably installed in the pintle sleeve 50 and is of a length less than the depth of pintle sleeve 50. A pintle spring 57 is installed inside the pintle neck 56 and bears between the pintle support 49 and the end surface of the pintle head 53. The pintle spring 57 tends to urge the pintle head 53 in a proximal direction toward closing with respect to the valve seat 46 as shown in FIG. 4. The pintle valve is opened upon exertion of force in a distal direction against the pintle tip 54 of pintle 52 and against the bias of the pintle spring 57.

Valve seat 46 is recessed in passage 44 or spaced inwardly from the proximal end of housing 37 for purposes of engagement with second connector 38. Second connector 38 has a housing comprised as a cylindrical base 60 having a proximal end 61 intended for facing relationship to the first connector 37, and a distal end 62 having an interioraly threaded opening for threaded receipt of the male portion of a second hydraulic fitting 65. The proximal end 61 is open and exteriorly threaded. An end cap 63 has side walls 66 that are interioraly threaded and in engagement with the exterior threads of proximal end 61 to close the proximal end of the base 60.

Base 60 has a circumferential groove 67 adjacent the edge of the side wall 66. Edges of mounting plate 22 defining a circular mounting opening are engaged in the groove 67 between the confronting edges of the base 60 and side wall 66 of cap 63 to securly mount the second connector 39 with respect to the mounting plate 22.

Base 60 and end cap 63 define an inner chamber 69. A mounting member for a movable pintle assembly is stationarily located in chamber 69 and includes a pilot column 70 and an enlarged portion or shoulder 71. Shoulder 71 is located at the distal end of chamber 69 in spaced relationship from the interior walls of chamber 69 defining a cavity 74 forming a seat for a main spring or plunger spring 75. Column 70 has a diameter less than shoulder 71 forming a proximally facing or outwardly facing ledge 72. As shown in FIG. 3, column 70 and shoulder 71 can be formed integral with base 60.

A plunger 76 is movably assembled with respect to chamber 69 of base 60. Plunger 76 includes an elongate cylindrical barrel portion 78 extending from chamber 69 outward of cap 63 through a central proximal opening provided therein. A slideable sealing engagement is formed by a seal or O-ring 82 seated in a groove 83 located in the annular edge defining the central opening in cap 63. A reduced plunger head 79 is located at the outboard end of barrel portion 78 and has a central opening defined by inwardly tapered edges forming a second valve seat 80. The inboard end of barrel portion 78 has a pair of parallel, spaced apart annular flanges 84, 85. A seal or O-ring 87 is located in the space between the flanges 84, 85. O-ring 87 is in sliding and sealing engagement with the interior walls of chamber 69. Inward or distal movement of plunger 76 is limited by the ledge 72. Plunger spring 75 bears between the distal end of chamber 69 and the rearward flange 85 of plunger 76 biasing the plunger 76 outward of chamber 69 or in a proximal direction.

Plunger 76 has a second central hydraulic fluid passage 88 extending the length thereof. The inboard end of plunger 76 is slideably installed on pilot column 70. The diameter of passage 88 at the inboard end thereof corresponds to the outside diameter of column 70 for a slip fit relationship. Fluid passage 88 of plunger 76 is continuous through a passage 88A in column 70 and shoulder 71 open to the end opening of base 60 and the second hydraulic fitting 65. A fluid seal between the interior walls of plunger 76 defining passage 88 and the outer wall of column 70 is maintained by a seal or O-ring 89 located in an annular peripheral groove or O-ring seat 90 in the wall of column 70.

Second fluid passage 88 is opened and closed by a second pintle valve assembly 92 constructed like first pintle valve assembly 48. Pintle valve assembly 92 includes a pintle support 93 seated in passage 88 with a retainer ring 94, and a pintle sleeve 96 extending from the pintle seat 93 toward valve seat 80. A valve element or pintle 97 is installed in pintle sleeve 96. Pintle 97 includes a pintle head 98 configured to engage valve seat 80 and having a diameter larger than sleeve 96. A pintle tip 99 extends outward of plunger 76. A tubular pintle neck 101 is connected to pintle head 98 and has an outside diameter smaller than the inside diameter of the pintle sleeve 96. Pintle neck 101 is slideably installed in the pintle sleeve 96 and is of a length less than the depth of the pintle sleeve 96. A pintle spring 102 is installed inside the pintle neck 101 and bears between the pintle seat 93 and the end surface of pintle head 98. The pintle spring 102 urges the pintle head 98 towards a closed position in engagement with the valve seat 80.

The first pintle support 49 and the second pintle support 93 are alike in construction. Referring to FIG. 5, the second pintle support 93 includes a circular platform 103 retaining the pintle spring 102 within the pintle sleeve 96. Platform 103 has a diameter or dimension substantially less than that of passage 88. A plurality of legs 105 extend from platform 103 to the inside walls of plunger 76 defining passage 88. Hydraulic fluid flows past the pintle assembly between the legs 105. Legs 105 are retained by retainer ring 94 in passage 88.

A fluid pressure port 106 (FIGS. 3 and 6) is open through shoulder 71 between fluid passage 88A and spring cavity 74 in order to provide hydraulic fluid under pressure to the cavity 74 for the purpose of exerting outward force on plunger 76 in addition to plunger spring 75. A bleed port 107 (FIGS. 3 and 5) extends from chamber 69 through cap 63 at a location just above the end edge of base 60. Bleed port 107 opens to the exterior environment to provide release of hydraulic fluid as may have seeped beyond O-ring seal 87 to a position ahead of the piston like end of plunger 76 provided by flanges 84, 85 and O-ring seal 86.

In use, prepatory to making a hydraulic fluid connection, the first and second connectors 37, 38 are poised in mutual alignment as shown in FIG. 4. This occurs prepatory, for example, to attachment of a loadline to a load handling member with a latching mechanism remote from the hydraulic coupling as shown in FIGS. 1 and 2. The first and second connectors are brought together as shown 3. The outside diameter of the plunger 76 fits closely within the proximal end opening of the proximal end 42 of housing 40. The reduced head section 79 of plunger 76 fixed in a correspondingly reduced portion of the end opening of housing 40. An O-ring 109 situated in an annular groove 110 in passage 44 is positioned to intercept the shoulder of plunger 76 at the juncture of the barrel section 78 and reduced head 79. This occurs also when the valve seat 46 of the first connector abuts the valve seat 80 of the second connector. At that point the pintle tips 54, 99 have engaged and mutually retracted away from the valve seats against the bias of the first pintle spring 56 and the second pintle spring 102, opening the fluid channel 44 to the fluid passage 88 of the second connector 37. The first and second connectors 37, 38 are brought together under the weight of the load line bearing upon the load handling member. The main spring 75 is compressed in the spring cavity 74 and bears against the second flange 85 on the end of the plunger 76. The main spring 75 has a spring constant much greater than that of either of the pintle springs, for example, by a factor of five. The main spring 75 exerts a substantial force on plunger 76 tending to maintain the pintles of the first and second pintle assemblies 48, 92 in engagement and in the retracted position. Hydraulic fluid under pressure passing through pressure port 106 into the cavity 74 also bears against the end flange 85 of plunger 76 to further bias it outwardly of chamber 61. Connection of the coupling assembly 10 is accomplished simply by moving the first and second connectors together. Disconnection is accomplished by moving them again apart whereupon the pintle assemblies 48, 92 will close the valve seats 46, 80. The first and second connectors 37, 38 are held in connected relationship by the external latching mechanism shown in FIGS. 1 and 2. There is apt to be a certain amount of movement permitted by the latching mechanism that might otherwise cause separation of the first and second connectors 37, 40 which would tend to close the valve seats. Compensation for this is provided by the main spring 75 and fluid pressure in the spring cavity 74 which tends to move the plunger 76 in the chamber 61 responsive to relative movement between the housing 40 and of the first connector and the base 60 of the second connector.

The embodiments of the invention in which an exclusive property or privilege is claimed are defined as follows:

1. A hydraulic coupling comprising:
a first connector having a first housing with a first fluid passage extending through the first housing from a distal end thereof at a distal end opening to a proximal end thereof at a proximal end opening, means on the first housing for connection to a hydraulic fluid line at the distal end thereof, a first valve assembly located in the first fluid passage in stationary relationship to the first housing, said first valve assembly including a valve seat located in the fluid passage of the first housing, a valve element, means for movement of the valve element into and out of closing engagement with the valve seat from a direction behind the valve seat relative to the proximal end of the housing, and first bias means biasing the valve element in engagement with the valve seat;
a second connector having a second housing having an interior chamber and a distal end opening at a distal end and a proximal end opening at a proximal end, means on the second housing at the distal end opening for connection to another hydraulic fluid line;
a plunger movably positioned in the chamber of the second housing, said plunger movable between positions toward the distal end of the housing and toward the proximal end of the housing, said plunger having a second fluid passage communicating with the distal end opening of the second housing, and a second valve assembly located in the second fluid passage including a valve seat in the second fluid passage, a valve element, means for movement of the valve element into and out of closing engagement with the valve seat from a location behind the valve seat relative to the proximal end of the housing, and second bias means biasing the valve element in engagement with the valve seat;
plunger bias means biasing the plunger toward the proximal end of the second housing;
said first and second valve elements having tip portions on the proximal side of the first and second valve seats when in closing engagement with the valve seats, that bear against one another to mutually move the first and second valve elements away from the first and second valve seats when the proximal ends of the first and second connectors are brought together, to open a hydraulic fluid conduit between the first fluid passage of the first housing and the second fluid passage of the plunger against the bias of the first bias means, the second bias means and the plunger bias means;
said plunger having an elongate barrel portion with an inboard end moveably located in the chamber of the second housing and an outboard end extending outward of the housing through the proximal end opening of the housing and having said second fluid passage, said second valve assembly being located at the outboard end of the plunger;
said barrel portion of the plunger having annular flange means located toward the inboard end thereof; sealing means making sealing engagement between the plunger and the walls of the chamber of the second housing as the plunger moves between positions toward the distal end of the second housing and the proximal end of the second housing.
wall means separating the second fluid passage and the second housing chamber at a location distal to the inboard end of the plunger, said plunger bias means including a fluid pressure port extended between the second fluid passage and the second housing chamber at a location distal to the inboard end of the barrel portion of the plunger.

2. The hydraulic coupling of claim 1 wherein: said plunger bias means acts on the inboard end of the plunger.

3. The hydraulic coupling of claim 2 wherein: said plunger bias means includes a helical compression spring located in the distal end of the chamber of the second housing and acting on the inboard end of the plunger.

4. The hydraulic coupling of claim 2 wherein: said plunger bias means includes a helical compression spring located in the second housing chamber acting between the flange and the distal end of the chamber.

5. The hydraulic coupling of claim 2 wherein: the inboard end of the barrel portion of the plunger has first and second parallel spaced apart annular flanges, said plunger bias means including a helical compression spring located in the second housing chamber and acting between the distal end of the chamber and one of the flanges, and said sealing means located between the flanges and in sliding and sealing engagement with interior walls of the second housing.

6. A hydraulic coupling comprising:
a first connector having a first housing with a first fluid passage extending through the first housing from a distal end thereof at a distal end opening to a proximal end thereof at a proximal end opening, means on the first housing for connection to a hydraulic fluid line at the distal end thereof. a first valve assembly located in the first fluid passage in stationary relationship to the first housing, said first valve assembly including a valve seat located in the fluid passage of the first housing, a valve element, means for movement of the valve element into and out of closing engagement with the valve seat from a direction behind the valve seat relative to the proximal end of the housing, and first bias means biasing the valve element in engagement with the valve seat;
a second connector having a second housing having an interior chamber and a distal end opening at a distal end and a proximal end opening at a proximal end, means on the second housing at the distal end opening for connection to another hydraulic fluid line;
a plunger movably positioned in the chamber of the second housing, means for movement of the plunger between positions toward the distal end of the housing and toward the proximal end of the housing, said plunger having a second fluid passage communicating with the distal end opening of the second housing, and a second valve assembly located in the second fluid passage including a valve seat in the second fluid passage, a valve element, means for movement of the valve element into and out of closing engagement with the valve seat from a location behind the valve seat relative to the proximal end of the housing, and second bias means biasing the valve element in engagement with the valve seat;
plunger bias means acting on the inboard end of the plunger biasing the plunger toward the proximal end of the second housing;
said first and second valve elements having tip portions on the proximal side of the first and second valve seats when in closing engagement with the valve seats, that bear against one another to mutually move the first and second valve elements away from the first and second valve seats when the proximal ends of the first and second connectors are brought together, to open a hydraulic fluid conduit between the first fluid passage of the first housing and the second fluid passage of the plunger against the bias of the first bias means, the second bias means and the plunger bias means;
said plunger having an elongated barrel portion with an inboard end moveably located in the chamber of the second housing and an outboard end extending outward of the housing through the proximal end opening of the housing and having said second fluid passage, said second valve assembly being located at the outboard end of the plunger; means at the proximal end opening of the second housing making sliding and sealing engagement with the barrel portion of the plunger;
said means for movement of the plunger means including a pilot column located in the second housing chamber fixed to the distal end thereof and extending toward the proximal end, said plunger being slidably installed on the pilot column for sliding movement thereon guided by the pilot column, said pilot column having a tubular passage constituting a portion of the fluid passage of the plunger.

7. The hydraulic coupling of claim 6 including: a shoulder fixed at the distal end of the second housing chamber in surrounding relationship to the pilot column forming a ledge providing a distal stop for movement of the plunger, said shoulder spaced from the interior walls of the second housing chamber to form a spring cavity, said bias means including a helical plunger spring seated in the spring cavity acting between the distal end of the chamber and a portion of the plunger.

8. The hydraulic coupling of claim 7 wherein: said bias means includes a fluid pressure port extended between the second fluid passage and the housing chamber at a location distal to the inboard end of the barrel section of the plunger.

9. The hydraulic coupling of claim 7 wherein: the inboard end of the barrel section of the plunger has an annular flange, said plunger spring acting between the flange and the distal end of the second housing chamber and including sealing means located on the inboard end of the plunger in sliding and sealing engagement with interior walls of the second housing chamber.

10. The hydraulic coupling of claim 7 wherein: the inboard end of the barrel section of the plunger has first and second parallel, spaced apart annular flanges, said plunger spring bearing between one of said flanges and the distal end of the chamber and including sealing means located around the barrel section of the plunger between the first and second flanges and in sliding and sealing engagement with interior walls of the second housing chamber.

11. The hydraulic coupling of claim 10 wherein: said first and second bias means biasing the valve elements of the first and second valve assemblies include valve element springs, said plunger spring having a spring constant greater than the valve element springs.

12. A hydraulic coupling comprising:
a first connector having a generally cylindrical housing with a first fluid passage extending through the first housing from a distal end at a distal end opening to a proximal end at a proximal end opening;
means on the first housing for connection to a first hydraulic fluid line at the distal end opening thereof;
a first pintle valve assembly located in the first fluid passage in stationary relationship to the first housing, said first pintle valve assembly including a first valve seat located in the first fluid passage recessed relative to the proximal end opening, a first pintle, means for movement of the pintle into and out of closing engagement with the valve seat from a direction behind the valve seat relative to the proximal end of the housing, said first pintle having a pintle head engagable with the first valve seat and a pintle tip extended outward of the pintle head, and a first pintle spring biasing the pintle in engagement with the valve seat;

a second connector having a second housing having an interior chamber and a distal end opening at a distal end, and a proximal end opening at a proximal end, means on the second housing at the distal end opening for connection to a second hydraulic fluid line;

a plunger having an elongate barrel portion with an inboard end movably located in the chamber of the second housing and spaced from the walls thereof, and an outboard end extended outward of the housing through the proximal end opening, a second fluid passage extending through the barrel portion of the plunger and communicating with the distal end opening of the second housing at the outboard end;

a second pintle valve assembly assembled in stationary relationship to the plunger located in the second fluid passage of the plunger including a second valve seat at the outboard end of the barrel portion of the plunger, a second pintle located in the second fluid passage, means for movement of the second pintle into and out of closing engagement with the second valve seat, said second pintle having a pintle head engageable with the second valve seat and a pintle tip extended outward of the pintle head, and a second pintle spring biasing the pintle head in engagement with the second valve seat;

sealing means located between the plunger and the interior chamber of the second housing making sliding sealing engagement between the plunger and the walls of the interior chamber;

a plunger spring situated in the chamber of the second housing and acting on the inboard end of the plunger to bias the plunger in a proximal direction outward of the housing; and annular flange means located on the barrel portion of the plunger toward the inboard end thereof.

13. The hydraulic coupling of claim 12 including: an annular flange on the inboard end of the plunger, said plunger spring acting on said flange.

14. A hydraulic coupling comprising:

a first connector having a generally cylindrical housing with a first fluid passage extending through the first housing from a distal end at a distal end opening to a proximal end at a proximal end opening;

means on the first housing for connection to a first hydraulic fluid line at the distal end opening thereof;

a first pintle valve assembly located in the first fluid passage in stationary relationship to the first housing, said first pintle valve assembly including a first valve seat located in the first fluid passage recessed relative to the proximal end opening, a first pintle, means for movement of the pintle into and out of closing engagement with the valve seat from a direction behind the valve seat relative to the proximal end of the housing, said first pintle having a pintle head engagable with the first valve seat and a pintle tip extended outward of the pintle head, and a first pintle spring biasing the pintle in engagement with the valve seat;

a second connector having a second housing having an interior chamber and a distal end opening at a distal end, and a proximal end opening at a proximal end, means on the second housing at the distal end opening for connection to a second hydraulic fluid line;

a plunger having an elongate barrel portion with an inboard end movably located in the chamber of the second housing, and an outboard end extended outward of the housing through the proximal end opening, a second fluid passage extending through the barrel portion of the plunger and communicating with the distal end opening of the second housing at the outboard end;

a second pintle valve assembly located in the second fluid passage of the plunger including a second valve seat at the outboard end of the barrel portion of the plunger, a second pintle located in the second fluid passage, means for movement of the second pintle into and out of closing engagement with the second valve seat, said second pintle having a pintle head engagable with the secured valve seat and a pintle tip extended outward of the pintle head, and a second pintle spring biasing the pintle head in engagement with the second valve seat;

sealing means located at the proximal end opening of the second housing making sliding sealing engagement with the barrel portion of the plunger;

a plunger spring situated in the chamber of the second housing and acting on the inboard end of the plunger to bias the plunger in a proximal direction outward of the housing;

a plunger mount in the second housing chamber including a pilot column located in the second housing chamber fixed to the distal end thereof and extending toward the proximal end, said plunger being slidably installed on the pilot column with the pilot column located partially in the second fluid passage of the plunger for sliding movement of the plunger guided by the pilot column, said pilot column having a tubular passage constituting a portion of the second fluid passage of the plunger.

15. The hydraulic coupling of claim 14 wherein: said plunger mount includes a shoulder fixed at the distal end of the second housing in surrounding relationship to the pilot column forming a ledge providing a distal stop for movement of the plunger, said shoulder spaced from the interior walls of the second housing chamber to form to spring cavity, said plunger spring seated in the spring cavity and acting between the distal end of the chamber and a portion of the plunger.

16. The hydraulic coupling of claim 15 including: a fluid pressure port extended between the second fluid passage and the spring cavity to provide further bias on the plunger tending to urge the plunger in a proximal direction.

17. The hydraulic coupling of claim 15 wherein: the inboard end of the barrel portion of the plunger has a first and second parallel, spaced apart annular flanges, said plunger spring bearing between one of said flanges and the distal end of the chamber, and including sealing means located around the barrel portion of the plunger between the first and second flanges and in sliding and sealing engagement with interior walls of the second housing chamber.

18. The hydraulic coupling of claim 17 including: a fluid pressure port extended between the second fluid passage and the spring cavity to provide further bias on the plunger tending to move the plunger in a proximal direction.

19. The hydraulic coupling of claim 18 wherein said coupling is in use with a load coupling connecting hydraulically actuated working equipment to a hydraulic fluid source for remote connection and disconnection by an equipment operator, including: remotely actuated load coupling means associated with the hydraulic equipment effective to maintain the first and second connectors in releasable engagement during operation of the hydraulic equipment.

* * * * *

UNITED STATES PATENT AND TRADEMARK OFFICE
CERTIFICATE OF CORRECTION

PATENT NO. : 5,016,671
DATED : May 21, 1991
INVENTOR(S) : Robert D. Barwise

It is certified that error appears in the above-identified patent and that said Letters Patent is hereby corrected as shown below:

Col. 2, line 37, "or" should be -- of --.

Col. 3, line 2, "securly" should be -- securely --.

Col. 3, line 34, " interioraly" should be -- interiorly --.

Col. 3, lines 37-38, "interioraly" should be -- interiorly --.

Col. 4, line 64, "prepatory" should be -- preparatory --.

Col. 4, line 67, "prepatory" should be -- preparatory --.

Col. 5, line 3, following "shown" insert -- in Fig. --.

Col. 7, line 18, "." should be -- , --.

Col. 10, line 18, "secured" should be -- second --.

Col. 10, line 45, "to" (second occurrence) should be -- a --.

Col. 10, line 54, following "has" delete -- a --.

Signed and Sealed this

Sixth Day of October, 1992

Attest:

DOUGLAS B. COMER

Attesting Officer     Acting Commissioner of Patents and Trademarks